United States Patent [19]
Toro

[11] 3,841,683
[45] Oct. 15, 1974

[54] SAFETY BUMPER

[76] Inventor: Anthony S. Toro, 6834 S.W. 15th St., Pembroke Pines, Fla. 33023

[22] Filed: Mar. 12, 1973

[21] Appl. No.: 340,045

[52] U.S. Cl. .................. 293/86, 293/71 P, 293/88
[51] Int. Cl. ............................................ B60r 19/10
[58] Field of Search ............ 293/70, 71 R, 71 P, 85, 293/86, 88; 152/361 R

[56] References Cited
UNITED STATES PATENTS

| | | | |
|---|---|---|---|
| 1,380,759 | 6/1921 | Whitaker, Jr. | 293/71 P |
| 1,580,203 | 4/1926 | Jasheway et al. | 293/71 P |
| 1,839,015 | 12/1931 | Deveaux | 293/88 |
| 2,145,952 | 2/1939 | Ryan | 293/71 R |
| 3,097,725 | 7/1963 | Peterson | 293/86 |
| 3,203,722 | 8/1965 | Zahorodny | 293/71 P |
| 3,623,527 | 11/1971 | O'Neil | 152/361 R |

FOREIGN PATENTS OR APPLICATIONS

| | | | |
|---|---|---|---|
| 639,747 | 5/1962 | Italy | 293/86 |

Primary Examiner—Robert S. Ward, Jr.
Assistant Examiner—Robert Saifer
Attorney, Agent, or Firm—M. A. Baskin

[57] ABSTRACT

A safety bumper for vehicles providing a three stage shock absorbing means to protect the vehicle from damage and, more importantly, to protect the occupants of the vehicle from serious injury or death. A first stage is provided by a pneumatic bumper tire for low speeds, a second stage by a heavy spring for intermediate speeds, and a third stage for higher speeds is provided by a rubber shock absorber.

2 Claims, 3 Drawing Figures

PATENTED OCT 15 1974　　　　　　　　　　3,841,683

3,841,683

SAFETY BUMPER

STATE OF THE PRIOR ART

U.S. Pat. No. 3,295,880 to M. J. Klosterman discloses a wooden plank connected to a vehicle by a pair of telescoping tubular members with a heavy spring being utilized in each pair. The purpose of this structure is for use on wreckers or the like and is intended to prevent damage to a vehicle being pushed. U.S. Pat. No. 3,361,467 discloses a single stage spring and rubber shock absorber means for a vehicle bumper which is good for minor impacts only. There is no cylindrical support for the device and vibrations and rattles would therefore result. U.S. Pat. No. 3,284,100 to L. M. Goff discloses a buffer device for pusher vehicles and more particularly, it concerns a resiliently mounted pusher plate to be mounted on the front end of a service vehicle to facilitate pushing a disabled vehicle. The resilient means is in the form of springs which compress in a manner so as to permit the buffer plate to remain fully in contact with the bumper of the vehicle being pushed even around tight curves.

U.S. Pat. No. 2,829,915 to E. Claveau discloses an inflatable elastic tube which is embedded partly in the body of a vehicle and is intended to continue the contours of the profile of the vehicle body for asthetic purposes. In this device the protective qualities of the bumper seem to be of a secondary nature.

Various other Patents, such as U.S. Pat. No. 2,593,586 to J. R. Maag and U.S. Pat. No. 2,145,952 to F. Ryan, show various forms of bumper utilizing heavy springs in telescoping cylinders.

BACKGROUND OF THE PRESENT INVENTION

The present invention pertains to a safety bumper for vehicles which will satisfy the recent clamor for bumpers being put on all cars that are capable of passenger protection as well as a means of minimizing the damage done to the vehicle. One of the principal objects of the present invention is to provide a three stage safety bumper with progressive collision factors built in.

Another object of this invention is to use air resiliency means to absorb the shocks of collisions at lower speeds, spring compression means to absorb the shocks at intermediate speeds and rubber shock absorbers at higher speeds.

A further object of the present invention is to mount the three stage safety bumper rigidly to the frame of the vehicle.

Yet another object of this invention is to provide a safety bumper for vehicles, as above described, which is relatively inexpensive to fabricate and install and which is composed of a minimum of parts.

DETAILED DESCRIPTION OF THE DRAWINGS

Figure 1:
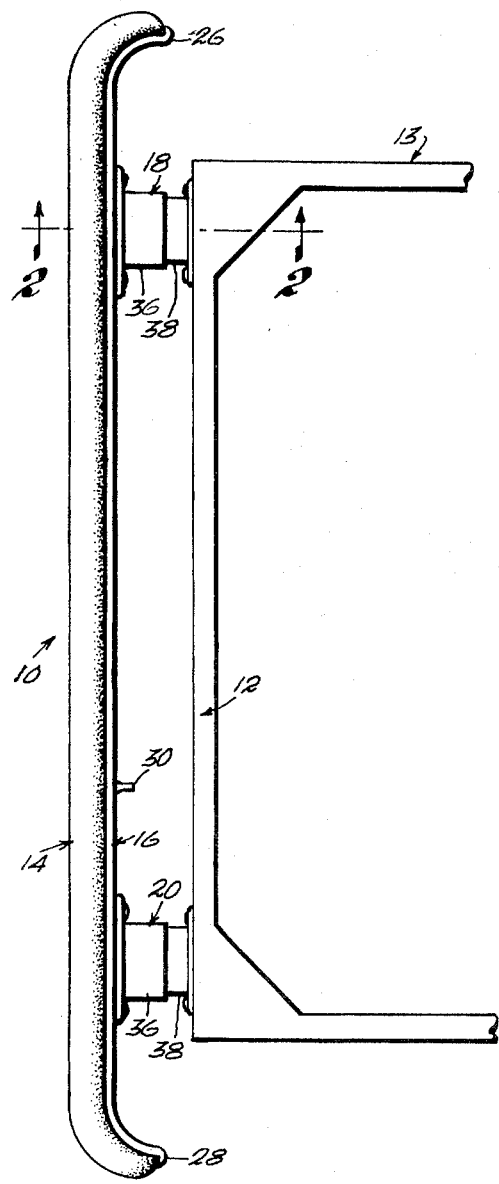
FIG. 1, is a top plan view of a safety bumper, in accordance with the present invention, installed relative to one end of the frame of a vehicle.

With reference to the drawings in which like reference characters designate like or similar parts throughout the two views of the drawings and with particular reference to FIG. 1, the numeral 10 generally designates the safety bumper structure of the present invention mounted to one end cross beam 12 of a vehicle frame 13. The safety bumper 10 includes a pneumatic tire member 14 spanning the front face of a steel bumper 16 which is connected to cross beam 12, adjacent both ends thereof, by a pair of telescoping members.

Figure 2:
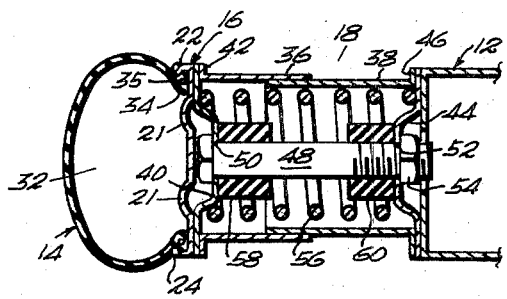
FIG. 2, is a vertical cross sectional view taken along the line 2-2 of FIG. 1.
Figure 3:
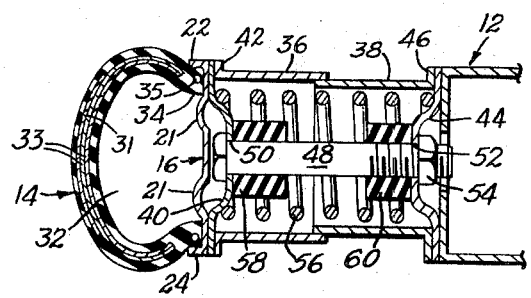
FIG. 3 is a vertical cross sectional view, similar to FIG. 2, illustrating a modified form of the invention.

Referring to FIG. 2, the steel bumper 16 is ribbed at 21 and provides upper and lower inwardly turned edge beads 22 and 24 which are interconnected by similar curved beads 26 and 28 formed about the curved ends of the steel bumper 16 to form a continuous peripheral bead about the steel bumper 16. The pneumatic tire member 14 is provided with an air inlet valve stem 30 in FIG. 1 extending rearwardly through the steel bumper 16 and opening into the air chamber 32 of the tire member 14. In a preferred structure, the tire member 14 would be formed, for example, of two or more nylon plies 31 with one or two steel belts 33 for strength. As illustrated in FIG. 2, a peripheral sealing bead 34 containing a steel cable 35 extends about the tire member 14 for seated engagement within the peripheral steel bumper bead indicated at 22, 24, 26 and 28. With further reference to FIG. 2, each cylinder assembly 18 and 20 includes outside and inside holding cylinders 36 and 38 which are telescopically engaged. The outside holding cylinder 36 is provided with a steel spring and limit bolt holder 40 at its outer end; the steel bumper 16, spring and limit bolt holder 40 and the outer end 42 of the outside holding cylinder being rigidly fixed in assembly by welding, for example. The inside holding cylinder 38 is provided with a steel spring and limit bolt holder 44 at its inner end; the cross beam 12 of the frame, spring and limit bolt holder 44 and the inner end 46 of the inside holding cylinder 38 being rigidly fixed in assembly as by welding.

A limit bolt 48 extends axially through appropriate holes 50 and 52 in the outer and inner spring and bolt holders 40 and 44 and is provided with a nut 54 on its inner end. Circumposed about the bolt 48 within the cylinder 36 and 38, a heavy coil spring 56 normally maintains the maximum spacing between the steel bumper 16 and the cross beam 12.

A pair of spaced apart rubber shock absorbers 58 and 60 surround the bolt 48 and respectively abut the opposed surfaces of the outer and inner spring and bolt holders 40 and 44.

The pneumatic tire member 14 makes initial contact and absorbs the shocks of collisions at lower speeds. At intermediate speeds, the compression of springs 56 absorb the shocks while at higher speeds the rubber shock absorbers 58 and 60 effectively absorb the shocks.

While a preferred form of the invention has been herein illustrated and described, it will be obvious to anyone skilled in the art that various changes and modifications can be made therein without departing from the true spirit of the invention as defined in the appended claims.

What is claimed is:

1. A three stage safety bumper for a car comprising:

A. a steel bumper including a forwardly, inwardly extending female peripheral bead;
B. a pneumatic bumper tire removably attached across the outer face of said steel bumper, including, 1. a male, flexible, peripheral sealing bead for removable engagement within said female peripheral bead;
C. an inlet valve stem for inflating said pneumatic bumper tire;
D. telescoping cylinder means attached to and extending between the inner face of said steel bumper and one end beam of the frame of a vehicle comprising,
  1. at least two outside cylinders, fixed relative to said steel bumper, and at least two inside cylinders, fixed relative to said end beam in telescopic, sliding engagement with the respective outside cylinders;
E. limiting means, within said telescoping cylinders, to limit the maximum spacing between said steel bumper and beam comprising,
  1. a bolt extending through each pair of inside and outside cylinders, fixed relative to said outside cylinder, and a nut, threaded onto said bolt, outwardly of said inside cylinder, to determine the maximum spacing between said steel bumper and end beam;
F. a pair of spaced apart rubber shock absorbers within each pair of telescoping cylinders, circumposed about said bolt; and
G. spring means, within each pair or telescoping cylinders to normally maintain the maximum spacing between said steel bumper and beam, comprising, 1. a heavy compression spring, circumposed about each of said bolts.

2. A three stage safety bumper as defined in claim 1 wherein said pneumatic bumper tire is constructed of a combination of nylon plies and at least one steel belt and said sealing bead contains a steel cable.

* * * * *